June 12, 1962
R. J. NADHERNY
3,038,181
BINDING APPARATUS
Filed Aug. 24, 1959
3 Sheets-Sheet 1
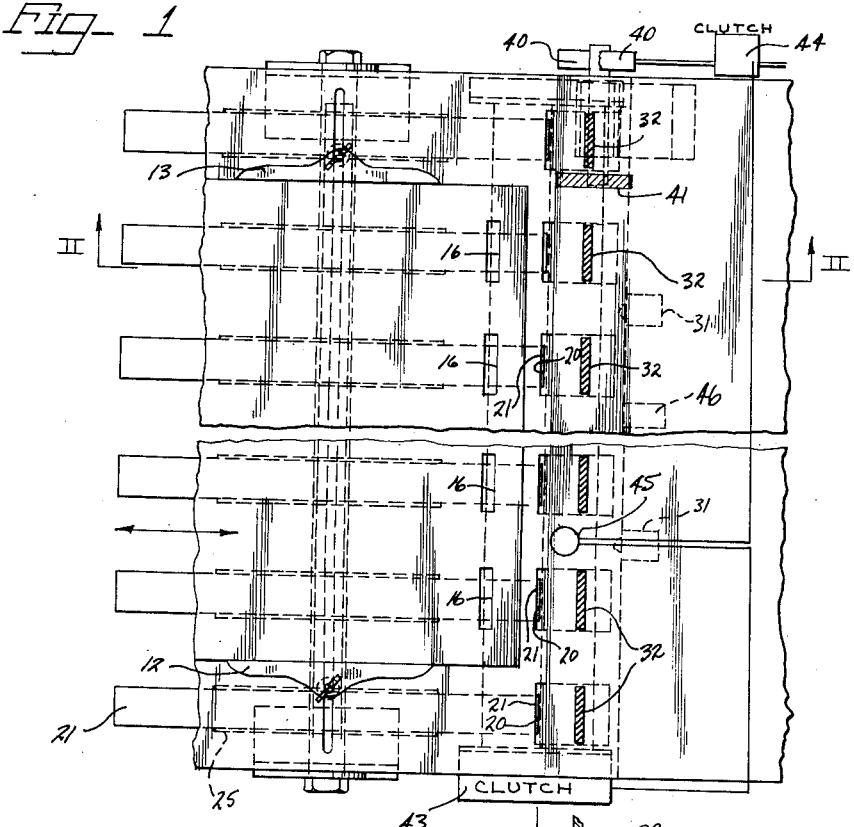
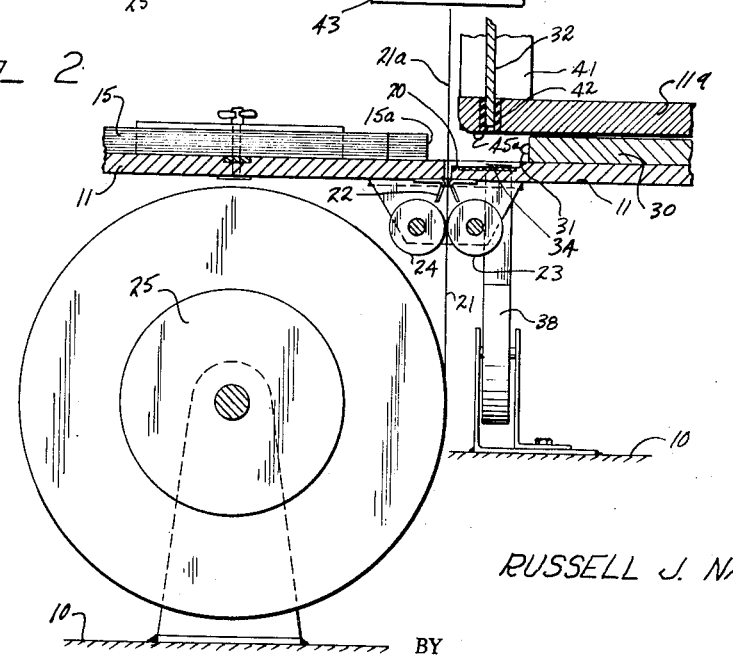
INVENTOR
RUSSELL J. NADHERNY
BY
Hill, Sherman, Meroni, Gross & Simpson
ATTORNEY June 12, 1962  R. J. NADHERNY  3,038,181
BINDING APPARATUS Filed Aug. 24, 1959  3 Sheets-Sheet 2

INVENTOR
RUSSELL J. NADHERNY
BY Hill, Sherman, Meroni, Gross & Simpson
ATTORNEY

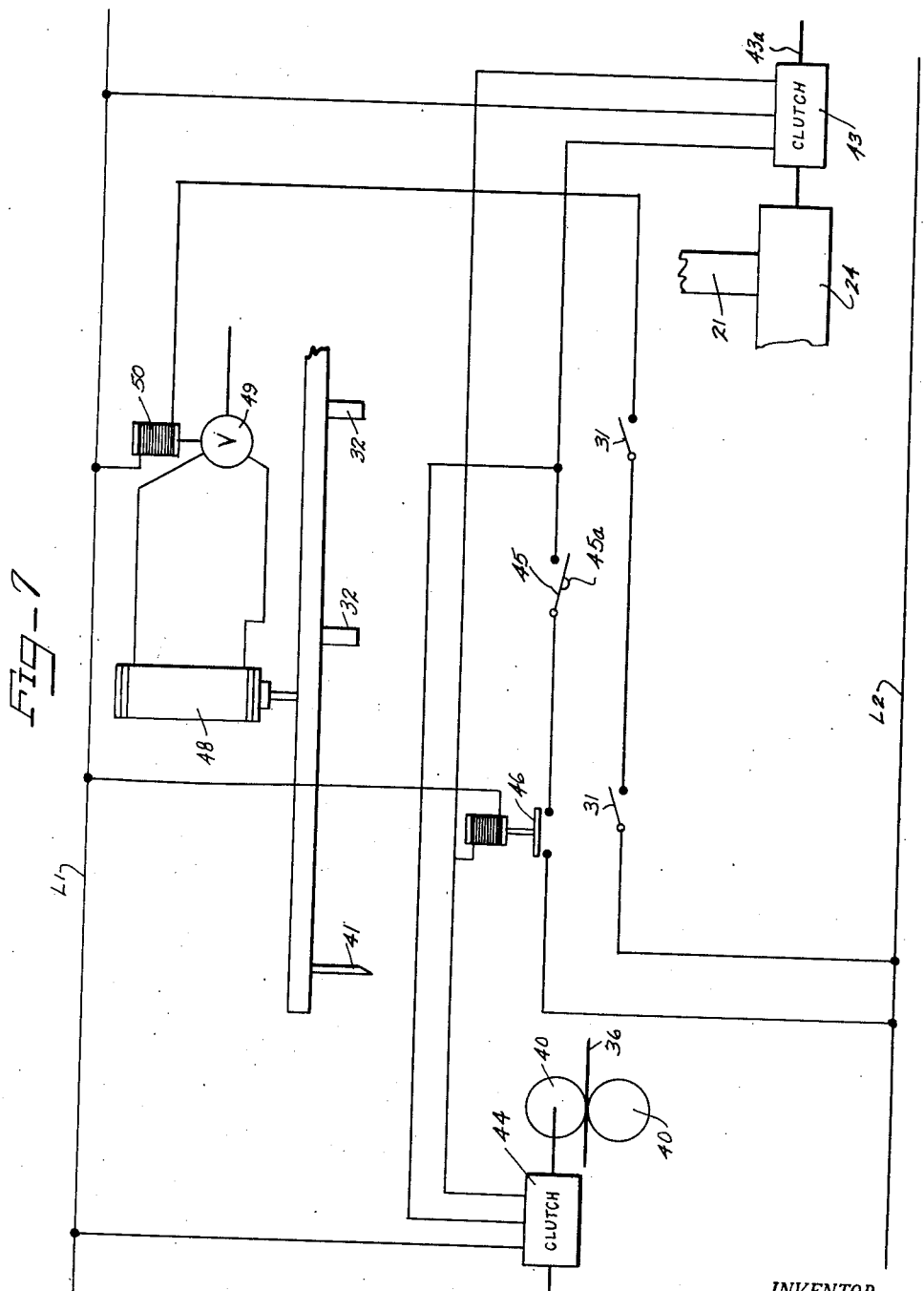

United States Patent Office 3,038,181
Patented June 12, 1962

3,038,181
BINDING APPARATUS
Russell J. Nadherny, Wilmette, Ill., assignor to General Binding Corporation, Northbrook, Ill., a corporation of Illinois
Filed Aug. 24, 1959, Ser. No. 835,789
9 Claims. (Cl. 11—1)

The present invention relates to apparatus for binding books or other devices comprising a plurality of perforated sheets. The invention also contemplates an improved method for inexpensively binding such devices in an extremely rapid manner.

More particularly, the present invention relates to an improved method of binding a plurality of perforated sheets or the like by one or more flexible rings of soft heat-sealable plastic material. I am, of course, aware of the fact that plastic binding elements of the heat-sealable type, employing high frequency electronic sealing means are known. However, to my knowledge, none of such known binders and techniques of binding provide extremely high speed and simple binding in the manner accomplished in accordance with the present invention.

In accordance with this invention, apparatus is provided for substantially automatically folding one or more plastic rings of sealable material of the conventional thermoplastic resinous film types, such as for example polyethylene and/or polyvinyl resin films around the perforated edges of a series of stacked sheets, and subsequently heat-sealing the ring into a permanent, closed, loop. In accordance with the present invention, the plastic material is continuously fed into the apparatus and requires no manual handling of any sort. The operator of the apparatus merely inserts a plurality of sheets of perforated material into the machine and withdraws the perforated sheet from the machine in bound form without the necessity of removing his hand or hands from the sheets placed into the machine. As a result, even inexperienced personnel may readily operate the apparatus successfully and achieve extremely satisfactory and inexpensive bindings.

It is accordingly, an object of the present invention to provide an improved method and apparatus for forming ring-like binding members and simultaneously binding a plurality of perforated sheets thereby.

Another object of the present invention is to provide an apparatus for substantially automatically binding perforated sheets.

Yet a further object of the present invention is to provide an extremely rapidly operating binding apparatus employing a binding material having great strength while at the same time remaining flexible and sufficiently loosely related to the perforated, bound, sheets to permit ready pivotal action of the sheets in the binding.

A feature of the invention comprises the provision of a plurality of separate rings each electronically welded to provide a separate perforated sheet binder.

Another feature of the invention resides in the provision of apparatus for simultaneously forming and welding a plurality of plastic ring-like members binding a plurality of perforated sheets together and simultaneously or sequentially providing an indicia bearing backbone member permanently secured to said plastic rings.

These and other objects and features of the invention will more fully appear from a consideration of the attached specification and drawings wherein embodiments of the invention are shown by way of illustration only, and wherein:

FIGURE 1 is a plan view of a preferred form of the apparatus constructed in accordance with the principles of the present invention;

FIGURE 2 is a side-elevational view, in partial cross-section, of the apparatus shown in FIGURE 1;

FIGURE 7 is a wiring diagram illustrating an exemplary form of control circuit for controlling operation of the apparatus.

As shown on the drawings:

Figure 3:
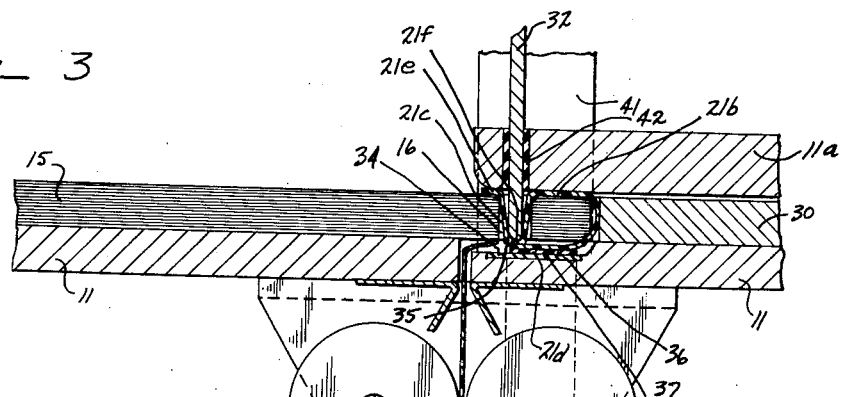
FIGURE 3 is an enlarged view of the ring-forming portion of the apparatus shown in FIGURE 2 in operation and immediately following the completion of a binding ring.
Figure 4:
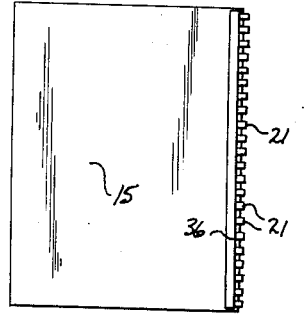
FIGURE 4 is an illustration of a book or similar object bound by the apparatus shown in FIGURES 1 through 3.

As best illustrated in FIGURES 1 through 4, the apparatus of the present invention comprises a frame diagrammatically illustrated at 10, and carrying a generally horizontal support plate 11. The plate 11 has a pair of adjustable side guides 12 and 13 designed to control the horizontal reciprocation of a stack of sheets 15 perforated at 16 and shown in FIGURES 1 and 2 in position on the support table 11 immediately prior to operation of the apparatus to bind the sheets together.

The base plate 11 is provided with a plurality of apertures through each of which a ribbon of ring-forming plastic 21 is vertically upwardly passed via guide 22, and power driven pressure rollers 23, 24, which withdraw the plastic 21 from a plurality of storage coils 25. The drive rolls 23, 24 are geared together for counterrotation, and one of them is driven by a motor through a conventional cyclical clutch 43, for example, a one-revolution clutch which will, upon energization, connect it to a rotating motor shaft 43a for a single cycle of rotation of the rollers 23 and 25. A single cycle of rotation of the rollers 23 and 24 will feed a ribbon or finger of material 21 upwardly through each of the apertures 20 into the position shown in FIGURE 2 at 21a. As noted, such one-revolution clutches are commonplace in the machinery art, and the details thereof are not shown. Suffice it to say that the clutch is preferably operated by an electrical solenoid (not shown), which may be manually energized by means of a switch 45 after each bound stack of sheets 15 is removed from the table 11 or, alternatively, automatically in a manner more fully described below.

After energization of the drive through rollers 23 and 24, positioning the respective strips of material 21 in the position shown in FIGURE 2, the stack of perforated sheets 15 is moved toward the right, as viewed in FIGURE 2, into the position illustrated in FIGURE 3. As may be observed, the leading edge 15a of the stack of sheets contacts the upstanding finger portions 21a forming them, in cooperation with the U-shaped anvil formed by supports 11 and 11a and stop 30, into a generally U-shaped configuration with the uppermost portions 21b of the strips 21 lying along the upper surface of the stack of sheets 15. Upon movement of the stack of sheets 15 toward the right the maximum allowed distance, determined by the stop abutment 30, micro-switches 31 are contacted and energized. Energization of the switches 31 causes movement of probe electrodes 32 downwardly into contact with the portion 21b of the strips 21 and forcing the portions 21c downwardly through the perforations 16 into contact with portions 21d of the strips 21. At the time of probe contact, high frequency passes from the probe 32 through the plastic to the plate 11 permanently welding or electronically sealing the overlapping edges at point 21f. In order to prevent arcing between the electrodes 32 and the plate 11, a thin pad of dielectric material 34, preferably of hard plastic, is set into the plate 11.

It is desired to cut the binding free from the strip 21 and from the end 21e as close as possible to point 21f. Accordingly, the probes 32 may be provided with a beveled edge 35 which will pinch off the ends 21e and the main body of ribbon material against pad 34 at the end of the sealing operation. The vertical stroke of the probe 32 may be adjusted to provide an actual physical contact between edge 35 and pad 34 to cause a physical cut-off. On the other hand, the probes can be adjusted to stop downward movement just above the pad 34 with the result that the then pinched area will be electronically burned through or severed in the welding operation.

In the arrangement shown in FIGURES 1, 2 and 3, it is considered desirable to provide a backbone. This backbone, indicated at 36, comprises a strip of plastic which may be of the same material as the strips 21 or, alternatively, may be of different colors, of stiffer material, or other characteristic as long as it is electronically sealable in the same fashion as the material 21. The strip 36 is fed into the recess 37 in the plate 11 from a storage spool 38 by means of rollers 40. The backkbone strip 36 is severed by means of cutting knife 41 moved simultaneously with electrodes 32. As shown, the backbone strip 36 is positioned between the probe 32 and the support plate 11 and, accordingly, the electronic sealing operation unites the backbone permanently to the binding rings or loops at the common point of overlapping, 21f. This provides a binding generally illustrated in FIGURE 4 in which rings 21 are all permanently welded to the vertical strip backbone 36.

It is considered highly desirable for the satisfactory opening and closing of the secured sheets 15 that the binding rings or loops be relatively loose after sealing. This is satisfactorily accomplished in an extremely simple manner in the present invention by relieving the support plate 11 at trough 37. As a result of this cutting away or relieving of the plate 11, the probes 32 are moved downwardly beyond the bottom surface of the stacks 15 for the sealing operation. Upon sealing, a large, loose, loop is provided which is sufficiently loose to permit pivoting of the bound sheets 15 relative to one another thereby providing a binding which permits the respective bound leaves 15 to be laid flat when open.

When the plastic ring material 21 is very soft the deflection thereof at 21g could, if not reversed, prevent free passage of the material past the edge 11b of the support 11a. However, in such instances, removal of the stack of sheets 15 from the positions shown in FIGURE 3 will automatically deflect the ends 21g toward the left into proper position for the next binding operations. This function may, if desired, also be positively accomplished by slidably mounting stop plate 30 relative to plates 11 and 11a. When so constructed the stop plate 30 is moved to the left in FIGURE 2 immediately prior to upward movement of material 21 to thereby prevent the upwardly traveling material from impinging on the bottom side of plate 11a. The plate 30 is then returned to the position shown in FIGURE 2, for example, by movement of the stack of sheets 15 during the binding operation. Of course, the plate 30 is thus slidable the switches 31 are positioned for actuation of the plate 30 when it is moved to the position of FIGURE 2 by the stack of sheets.

Figure 6:
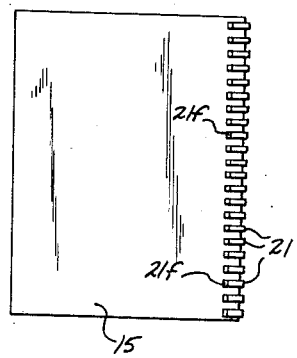
FIGURE 6 is a view of a book or similar object bound by the apparatus illustrated in FIGURE 5.
Figure 5:
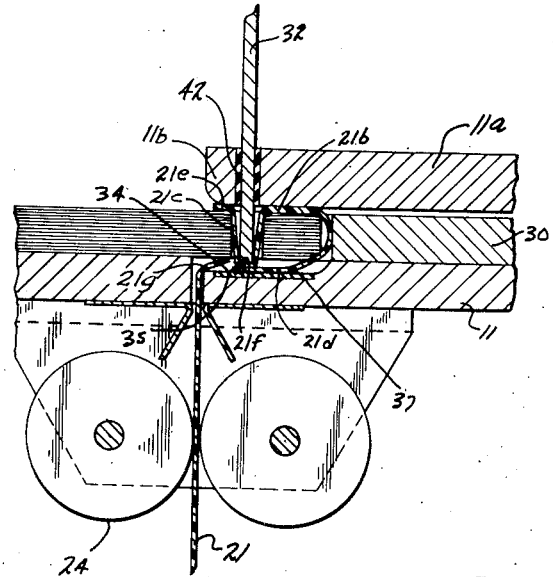
FIGURE 5 is an enlarged side-elevational view of apparatus similar to that illustrated in FIGURE 3 but operating to provide a ring binding without a backbone element.

As shown in FIGURES 5 and 6, the backbone 36 may be eliminated and the individual loops 21 formed completely separately.

The specific motor for moving the electronic probe 32 is diagrammatically shown in FIGURE 7 as being in the form of a hydraulic motor 48, similar to that illustrated in application Serial No. 683,555, filed by Peter J. Bardy on September 12, 1957, and now Patent No. 2,930,054, dated March 29, 1960, under the control of an electric valve 49 or, alternately may comprise electrical solenoid motors directly operated by an electric switch. In either case, the electrodes 32 are dielectrically insulated from the support plate 11a by dielectric bushings 42. The source of high frequency energy for welding or fusing the binding material is also not shown, since apparatus for this purpose is well known and available commercially as a separate unit capable of supplying, if desired, several welding and binding apparatus at once.

It is preferred that the operation of the binding apparatus herein disclosed be operated automatically. This is readily accomplished by electrically connecting the micro-switches 31 to a solenoid 50 for operating the valve 49 to energize said solenoid and open the valve 49 to supply fluid under pressure to the head end of the hydraulic motor 48 to move the probes 32 through the dielectric bushings 42 to engage and seal the strips of binding material 21, the high frequency electronic probes 32 and by providing a micro-switch 45 with an actuator 45a biased downwardly to close a circuit energizing one revolution clutch 43 driving rolls 23 and 24 and the clutch 44 driving rolls 40 upon withdrawal of each successive bound stack of sheets 15 from beneath the plate 11a. The clutches 43 and 44 preferably energize a solenoid type disabling or holding switch 46 in the circuit of the switch 45 opening that circuit on completion of the clutch cycles. The disabling switch may then be deenergized, in turn, to close said switch and reactivate the energizing circuit for the clutches 43 and 44 upon insertion of a stack of sheets 15 in binding position against, and closing of the switch 45. This sequential operation of control switches automatically binds the stack and then feeds a new supply of plastic strips 21a into position following removal of each successive stack of bound sheets. By this arrangement no manipulation of manual switches is necessary during the binding operation. In those cases in which the backbone 36 is employed, operation of the rolls 40 is preferably controlled to operate simultaneously with feeding of the strips 21.

In the form of the device illustrated, it is intended that the stack of sheets 15 be manually moved. However, it is clear that automatic feeding mechanisms of conventional form may, if desired, be employed for this function without changing the operation of the binding apparatus herein described.

It will be understood that variations and modifications may be made in the structure illustrated without departing from the scope of the novel concepts of the present invention. For example, the material feeding apparatus may be inverted to provide extrusion of the material downwardly into binding position across the opening between supports 11 and 11a. It is, accordingly, my intention to limit the scope of the present invention solely by that of the hereinafter appended claims.

I claim as my invention:

1. Apparatus for binding a stack of perforated sheets comprising a U-shaped anvil, means projecting a strip of plastic material across the opening of said anvil, a heat sealing probe movable transversely of one leg of said U against the other leg of said U, movement of said stack into said anvil operating to fold said plastic material around one edge of said stack into a U configuration, and means for moving said probe toward said other leg to intercept one leg of said folded plastic U and force it through the perforations of said sheets into sealing contact with the other leg of plastic material to thereby bind said stack of sheets in a sealed ring of plastic.

2. Apparatus for binding a stack of perforated sheets comprising a U-shaped anvil, means projecting a strip of plastic material across the opening of said anvil, a heat sealing probe movable transversely of one leg of said U against the other leg of said U, movement of said stack into said anvil operating to fold said plastic material around one edge of said stack into a U configuration, means for moving said probe toward said other leg to intercept one leg of said folded plastic U and force it through the perforations of said sheets into sealing contact with the other leg of plastic material to thereby bind said stack of sheets in a sealed ring of plastic and means associated with said probe for trimming said ring of plastic adjacent the sealing area.

3. Apparatus for binding a stack of perforated sheets comprising a U-shaped anvil, means projecting a strip of plastic material across the opening of said anvil, a heat sealing probe movable transversely of one leg of said U against the other leg of said U, movement of said stack into said anvil operating to fold said plastic material around one edge of said stack into a U configuration, and means for moving said probe toward said other leg to intercept one leg of said folded plastic U and force it through the perforations of said sheets into sealing contact with the other leg of plastic material to thereby bind said stack of sheets in a sealed ring of plastic, the other leg of said anvil having a relieved portion between the bight of the U and the point of contact of said probe whereby slack is provided in said sealed ring.

4. Apparatus for binding a stack of sheets each perforated at a multiplicity of spaced points along one edge thereof, comprising a U-shaped anvil, means projecting a plurality of strips of plastic material across the opening of said anvil, heat sealing probe means movable transversely of one leg of said U against the other leg of said U, movement of said sheets into said anvil operating to fold said strip of plastic material around one edge of said stack into a plurality of U's aligned with the perforations in said sheets, and means for moving said probe means toward said other leg to intercept one leg of each of said folded plastic U strips and force it through the aligned perforation of said sheets into sealing contact with the other leg of the plastic strip to thereby bind said stack of sheets in a plurality of sealed rings of plastic.

5. Apparatus for binding a stack of sheets each perforated at a multiplicity of spaced points along one edge thereof, comprising a U-shaped anvil, means projecting a plurality of strips of plastic material across the opening of said anvil, heat sealing probe means movable transversely of one leg of said U against the other leg of said U, movement of said sheets into said anvil operating to fold said strip of plastic material around one edge of said stack into a plurality of U's aligned with the perforations in said sheets, and means for moving said probe means toward said other leg to intercept one leg of each of said folded plastic U strips and force it through the aligned perforation of said sheets into sealing contact with the other leg of the plastic strip to thereby bind said stack of sheets in a plurality of sealed rings of plastic, the other leg of said anvil having a relieved portion between the bight of the U and the points of contact of said probe whereby slack is provided in said sealed rings of plastic.

6. Apparatus for binding a stack of sheets each perforated at a multiplicity of spaced points along one edge thereof, comprising a U-shaped anvil, means projecting a plurality of strips of plastic material across the opening of said anvil, heat sealing probe means movable transversely of one leg of said U against the other leg of said U, movement of said sheets into said anvil operating to fold said strip of plastic material around one edge of said stack into a plurality of U's aligned with the perforations in said sheets, means for moving said probe means toward said other leg to intercept one leg of each of said folded plastic U strips and force it through the aligned perforation of said sheets into sealing contact with the other leg of the plastic strip to thereby bind said stack of sheets in a plurality of sealed rings of plastic, and means associated with said probe means for trimming said rings of plastic adjacent the seals thereof.

7. Apparatus for binding a stack of sheets each perforated at a multiplicity of spaced points along one edge thereof, comprising a U-shaped anvil, means projecting a plurality of strips of plastic material across the opening of said anvil, heat sealing probe means movable transversely of one leg of said U against the other leg of said U, movement of said sheets into said anvil operating to fold said strip of plastic material around one edge of said stack into a plurality of U's aligned with the perforations in said sheets, means for moving said probe means toward said other leg to intercept one leg of each of said folded plastic U strips and force it through the aligned perforation of said sheets into sealing contact with the other leg of the plastic strip to thereby bind said stack of sheets in a plurality of sealed rings of plastic, and means projecting a strip of backbone plastic material immediately adjacent said other leg of said anvil and transversely of said rings of plastic and in the line of movement of said probe means whereby said backbone material is simultaneously sealed to each of said rings as the rings are sealed by said probe means.

8. Apparatus for binding a stack of sheets each perforated at a multiplicity of spaced points along one edge thereof, comprising a U-shaped anvil, means projecting a plurality of strips of plastic material across the opening of said anvil, heat sealing probe means movable transversely of one leg of said U against the other leg of said U, movement of said sheets into said anvil operating to fold said strip of plastic material around one edge of said stack into a plurality of U's aligned with the perforations in said sheets means for moving said probe means toward said other leg to intercept one leg of each of said folded plastic U strips and force it through the aligned perforation of said sheets into sealing contact with the other leg of the plastic strip to thereby bind said stack of sheets in a plurality of sealed rings of plastic, means projecting a strip of backbone plastic material immediately adjacent said other leg of said anvil and transversely of said rings of plastic and in the line of movement of said probe means whereby said backbone material is simultaneously sealed to each of said rings as the rings are sealed by said probe means, and means associated with said probe means for trimming said rings of plastic material and the backbone material upon movement of said probe means into sealing position against said other leg of said anvil.

9. Apparatus for binding a stack of perforated sheets comprising a U-shaped anvil, means projecting a strip of plastic material across the opening of said anvil, a heat sealing probe movable transversely of one leg of said U against the other leg of said U, movement of said sheets into said anvil operating to fold said plastic material around one edge of said stack into a U shape, switch means operable upon movement of said sheets into binding position in said anvil, drive means actuated by said switch means to move said probe toward said other leg of said anvil to intercept one leg of said folded plastic U and force it through the perforations of said sheets into sealing contact with the other leg of plastic to thereby bind said stack of sheets in a sealed ring of plastic and second switch means operated by removal of said stack of sheets from said U shaped anvil to operate said means projecting a strip of plastic material to project a second strip of plastic material across the opening of said anvil in preparation for a subsequent binding operation.

References Cited in the file of this patent

UNITED STATES PATENTS

| 2,200,877 | Farkas | May 14, 1940 |
| 2,273,824 | Barrett | Feb. 24, 1942 |
| 2,571,525 | Blitstein | Oct. 15, 1951 |
| 2,930,054 | Bardy | Mar. 29, 1960 |

FOREIGN PATENTS

| 157,636 | Australia | July 14, 1954 |